United States Patent [19]

Hisanaga et al.

[11] Patent Number: 4,976,547
[45] Date of Patent: Dec. 11, 1990

[54] CONTINUOUS TWO-LIQUID TYPE MIXER

[75] Inventors: Akinori Hisanaga, Hyogo; Takashi Sakubata; Tetsuo Yoshioka, both of Shiga, all of Japan

[73] Assignee: Kanegafuchi Kagaku Kogyo Kabushiki Kaisha, Osaka, Japan

[21] Appl. No.: 499,212

[22] Filed: Mar. 19, 1990

Related U.S. Application Data

[63] Continuation of Ser. No. 322,609, Mar. 13, 1989, abandoned.

[30] Foreign Application Priority Data

Mar. 14, 1988 [JP] Japan .................................. 63-61197
Apr. 14, 1988 [JP] Japan .................................. 63-92732

[51] Int. Cl.$^5$ .............................................. B01F 7/16
[52] U.S. Cl. .................................... 366/169; 366/173; 366/303; 366/307
[58] Field of Search ............... 366/303, 304, 307, 279, 366/302, 169, 173, 302

[56] References Cited

U.S. PATENT DOCUMENTS

2,033,413  3/1936  Chapman .
2,115,123  4/1938  Russell ................................. 366/303
4,527,902  7/1985  Christen ............................... 366/169
4,564,063  1/1986  Tollar .................................. 366/303

Primary Examiner—Robert W. Jenkins
Attorney, Agent, or Firm—Armstrong, Nikaido, Marmelstein, Kubovcik & Murray

[57] ABSTRACT

Disclosed is a continuous two-liquid type mixer comprising:
a cylindrical container having an liquid inlet at one end and an outlet at the other end;
rows of stationary stirring blades on the inside of said cylindrical container protruding substantially radially on the same periphery;
a rotor to rotate about the same axis and housed in said cylindrical container; and
rows of rotary stirring blades on the outside of said rotor protruding substantially radically on the same periphery in an alternate relation with said rows of stationary stirring blades on the inside of said cylindrical container, wherein at least one liquid injection inlet is provided on either or both of said stirring blades on said liquid inlet side. According to the present invention, even highly viscous liquids can be mixed quickly and uniformly and troubles caused by ununiform mixing can be solved without fail.

6 Claims, 4 Drawing Sheets

CONTINUOUS TWO-LIQUID TYPE MIXER

This application is a continuation of application Ser. No. 322,609 filed Nov. 13, 1989, now abandoned.

BACKGROUND OF THE INVENTION

1. Field of the Invention

The present invention relates to a continuous two-liquid type mixer for mixing two liquid materials, more particularly, it relates to a mixer capable of mixing quickly and uniformly two kinds of liquids such as liquid synthetic resins, solvents, curing agents and the like.

2. Description of the Prior Art

As materials for moldings such as synthetic resin films and synthetic resin sheets, synethetic resins of reactive curing type are often used, and examples of reactive curing type synthetic resins are polymide resin, epoxy resin, urethane resin, phenol resin, unsaturated polyester resin and the like.

Synthetic resins of the reactive curing type are known to be of two-liquid type and, when the two liquid components, such as a resin component and a curing component, are mixed, the viscosity of the mixture starts rising (curing starts) and continues rising until the mixture is no longer moldable. When a synthetic resin becomes unmoldable it reaches the end of its "pot life," and this pot life depends on the ambient temperature and the ratio of the two liquid components mixed together. Hence, when mixing of the two liquid components is not uniform, that is, when, for example, the concentration of the curing component is locally too high, such part is cured quickly a resulting in a state in which the cured or hardened portion of the resin remains suspended locally in the uncured portion. Even if mixing of the two liquid components is done uniformly, it is often possible that the pot life expires as the mixture remains in the mixer or locally quicker progress of curing takes place, which may possibly result in the coexistence of liquid mixtures having different properties.

If there are some portions which are advanced in the degree of curing in a mixed resinous liquid, they are likely to appear on the surface of a synthetic resin molding as foreign objects, or cause deterioration of the properties of molded articles, hence the mixer is required to be capable of mixing the two liquids uniformly and quickly, at the same time preventing dwelling of the mixed liquid in the mixer.

As such a mixer there is known one with both stationary and rotary impellers designed so that a resinous liquid flows through the liquid inlet toward the outlet of a cylindrical container, while the curing agent is fed in through a liquid inlet provided in the side wall of the cylindrical container so that the resin and the curing agent are mixed together continuously.

In this conventional device, the two liquids can be mixed together easily and uniformly if there is no difference in viscosities between them. However—, mixing is not easy if there is any sizable difference between a resin with its viscosity of several thousands poises and a curing agent whose viscosity ranges from several poises to several $10^{-3}$ poises. In such instances and the curing agent injected through the peripheral wall of the cylindrical container is caused to flow along its inside, sandwiched between layers of the resin to a given extent, and being mixed with the resin gradually. In the predetermined range the concentration of the curing agent remains high, hence the curing is enhanced locally, this giving rise to the aforementioned problem. Meanwhile, increasing the rotary stirring blade's speed in order to enhance mixing, the temperature of the solution rises due to generation of Joule's heat et cetera, resulting in a shorter pot life.

SUMMARY OF THE INVENTION

It is a primary object of the present invention to provide a continuous two-liquid type mixer free of the defects of the aforementioned conventional mixer.

Further objects and advantages will be apparent to those skilled in the art from reading of the detailed description below.

The present inventors have discovered, after their extensive and intensive research, that the aforementioned objects are attainable by providing at least one liquid injection inlet in either or both of the aforementioned stationary or rotary stirring blades.

BRIEF DESCRIPTION OF THE DRAWINGS

FIGS. 10 and 11 show further embodiments wherein the liquid injection inlets are provided in the rotary stirring blades.

DETAILED DESCRIPTION OF THE INVENTION

The present invention relates to a continuous two-liquid type mixer comprising:

(a) a cylindrical container with a liquid inlet at one end and an outlet at the other end thereof;

(b) rows of stationary stirring blades protruding substantially and radially inward from the inside of the aforementioned cylindrical container;

(c) a rotor to rotate about the same axis housed in the aforementioned cylindrical container;

(d) rows of rotary stirring blades protruding substantially radially outward from the outer surface of the rotor in an alternate relationship with the aforementioned stationary stirring blades: and (e) at least one liquid injection inlet provided on either or both of the stirring blades.

In such a continuous mixer of two-liquid type, the sectional area of the flow channel defined by the aforementioned cylindrical container, rows of stationary stirring blades, a rotor and rows of rotary stirring blades is made smaller or larger continuously or stepwise.

According to the present invention, a rotor having a plurality of rotary stirring blades is rotated in a cylindrical container having a plurality of stationary stirring blades with a first liquid material being fed through a liquid inlet provided at one end thereof and it is transferred toward the other liquid outlet by passing through and between the stationary stirring blades and the rotary stirring blades. Meanwhile, a second liquid material is fed into the cylindrical container through a liquid injection inlet into the cylindrical container. This liquid injection inlet is positioned in one or both sides of the stationary or/and rotary stirring blades. This second liquid material is fed into the whirling first liquid material in the cylindrical container spirally, while the second liquid material is covered by the first liquid material and is thus prevented from contact with the rotor, outer wall or the inner wall of the cylindrical container. Hence, the second liquid material is sheared and stirred by the stationary stirring blades and the rotary stirring blades and finely together with the first material, and the injected second liquid material is quickly mixed with the first liquid material from inside and both liquid materials are mixed uniformly and transferred compressively toward the outlet.

Where the sectional area of the flow channel is formed to be narrower than the liquid inlet toward the outlet, the flow speed of the two liquids stirred and mixed together is increased and the mixture flows out of the cylindrical container quickly. Meanwhile, when it is so designed for the sectional area to become pregressively wider, the two liquid materials are sheared quickly in the vicinity of the liquid inlet and then the liquid mixture is familialized and homogenized in the container of an increased sectional area before the mixed liquid leaves the cylindrical container.

A preferred embodiment of the present invention is described in greater detail with reference to the appended drawings.

Figure 1:
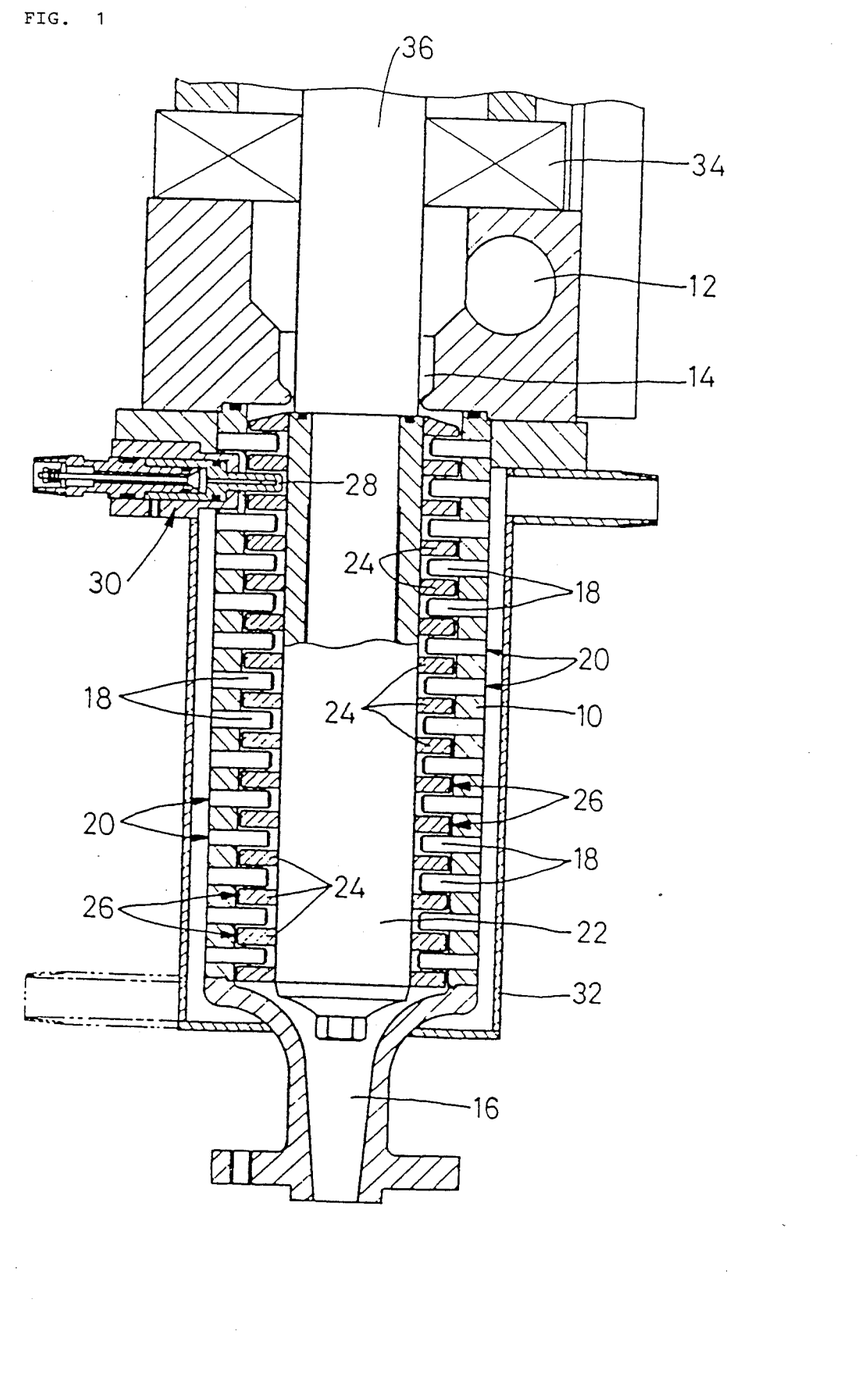
FIG. 1 is longitudinal sectional view of the essential parts of a continuous two-liquid mixer of the present invention.
Figure 2:
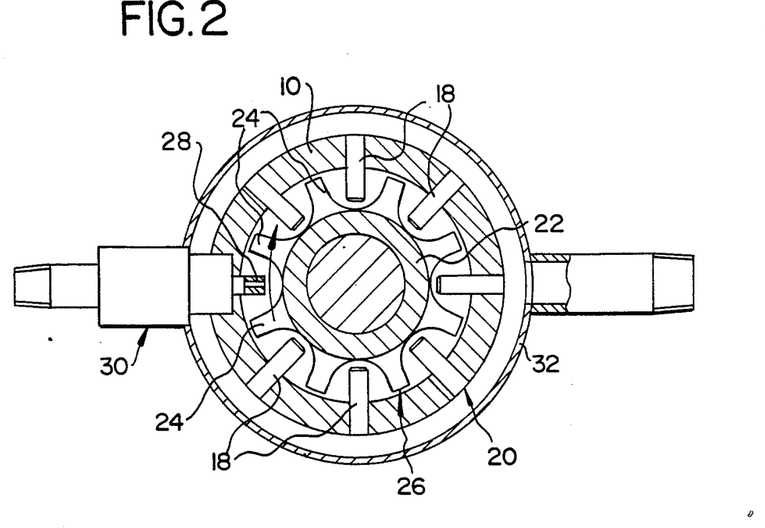
FIG. 2 is a horizontal sectional view corresponding to FIG. 1.

Referring to FIGS. 1 and 2, numeral 10 designates a cylindrical container of a continuous two-liquid mixing device. At one end of the cylindrical container there is provided a liquid inlet 14 to which the liquid resin pumped from a feeding channel 12. A nozzle-like outlet 16 is provided at the other end. On the inside of the cylindrical container 10 are provided a plurality of column-like cylindrical, stationary stirring blades 18 on the same periphery and equidistantly, spaced and rows 20 of stationary stirring blades 18 arranged on the same periphery (a plurality of stages).

On the inside of cylindrical container 10 there is housed a rotor 22 with its axis agreeing therewith, and these rotors 22 are driven by a driving unit (not shown). On the outside of the rotor 22 are provided a plurality of rotary stirring blades 24 spaced equidistantly on the same periphery and rows 26 of a plurality of the rotary stirring blades 24 are in alternate relationship with rows 20 of stationary stirring blades 18. The rotary stirring blades, 24 are, for instance, made by cutting out a disk and finishing it to the desird shape and then by fixing on the periphery of the rotor 22 by press fitting or shrinkage fitting and smaller ones can be made integrally with the rotor 22. Hence, the rows 26 of rotary stirring blades are driven to rotate with the rotor 22 between the adjacent rows 20 of the stationary stirring blades.

In one of the stationary stirring blades 18, disposed on the side of the liquid inlet 14 of the cylindrical container 10, a liquid injection inlet 28 protrudes substantially radially from the same periphery as the stationary stirring blades for feeding a curing agent into the cylindrical container 10.

In the preferable embodiments, the liquid injection inlet 28 is provided at the position relatively behind the liquid flow generated by the rotation of said rotary stirring blades, i.e., it faces in the same direction as the rotating direction of the rotor 22 and the rotary stirring blades 24. By following this design, the injected curing agent always follows the synethetic resin flowing without risk of the synethetic resin flowing into the liquid injection inlet 28.

Figure 3:
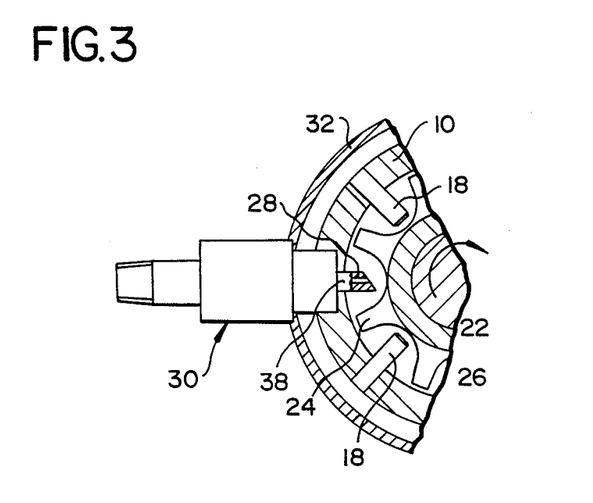
FIG. 3 is a horizontal sectional view of the essential parts showing another embodiment of the liquid injection inlet.

For instance, the liquid injection inlet 28 may be formed, as shown in FIG. 3, by inclining the end of the stationary stirring blade 38 provided with the liquid injection inlet 28 and positioning it so that the inclined opening faces toward the direction with the rotating direction of the rotor 22 and the rotary stirring blades 24.

Figure 4:
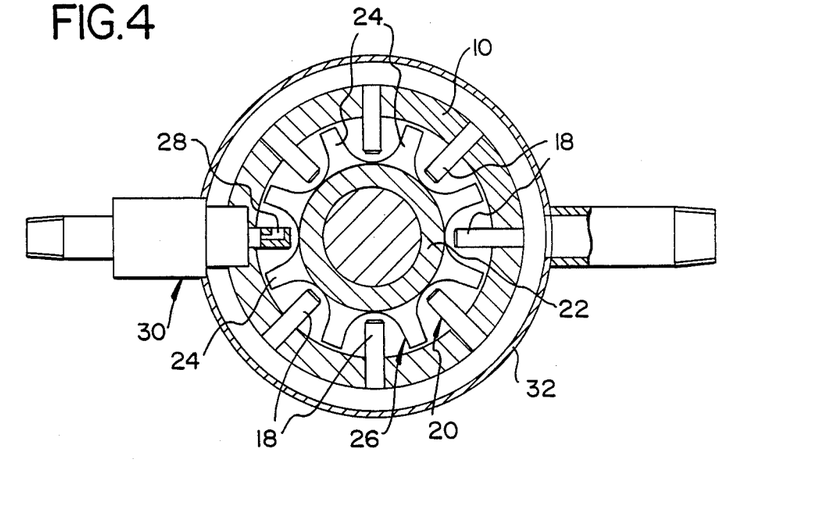
FIG. 4 is a horizontal sectional view showing an other embodiment of the liquid injection inlet.

In the embodiment shown in FIG. 4, the liquid injection inlet 28 faces to the same direction with the rotating direction of the rotor 22 and the rotary stirring blades 24.

Figure 5:
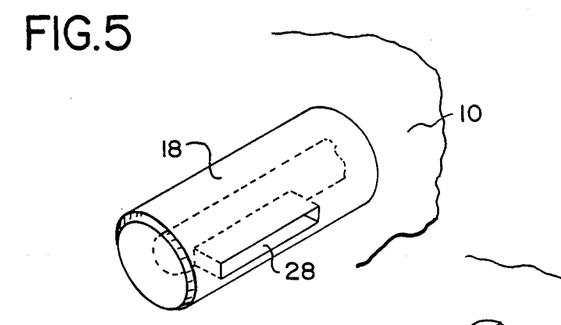
FIG. 5 is an enlarged perspective view of a stationary stirring blade in which a liquid injection inlet is formed.

In FIG. 5, there is formed a slit-like liquid injection inlet 28 opening in the side parallel to the radial direction, and it is so arranged that the curing agent is fed into the cylindrical container 10 is a planar sheet form from the central part to the inner peripheral part. As seen from FIG. 2, the rotor 22 is driven clockwise and the liquid injection inlet 28 is so provided that the curing agent follows the synthetic resin flowing in the cylindrical container 10. There is, therefore, no risk of the synthetic resin flowing into the liquid injection inlet 28, while the liquid injection inlet 28 is subject to a back pressure due to flowing synthetic resin and, thus, the curing agent is injected thereinto continuously and at a well stabilized rate. The other end of the liquid injection inlet 28 is connected to a pump (not shown) through a check valve 30, so as to build up a pressure to ensure against back flow of the synthetic resin. The cylindrical container 10 is encased in an outer cylinder 32 and a liquid such as a refrigerant is caused to flow between the outer cylinder 32 and the cylindrical container 10 so that the temperature of the cylindrical container 10 is kept constant. Numeral 34 (FIG. 1) designates a mechanical seal, which is provided to ensure against leakage of the synthetic resin pumped from the feeding channel 12 between the cylindrical container 10 and the shaft 36 of the rotor 22.

In a continuous two-liquid mixer of such construction, the resin pumped from the feeding channel 12 is fed from the liquid inlet 14 to the interior of the cylindrical container 10 and then pushed to the outlet 16 by the pressure of the resin being fed successively. Meanwhile, the curing agent is fed through the liquid injection inlet 28 into a mass of synthetic resin in a sheet form and the synthetic resin and the curing agent are thoroughly stirred between the stationary stirring blades 18 and the rotary stirring blades 24 and mixed.

While the viscosity of a synthetic resin is on the order of several thousand poises, the viscosity of a curing agent ranges from several poises to several $10^{-3}$. Two liquids having such different viscosities are difficult to diffuse and are not easily miscible. Worse, a synthetic resin high in viscosity does not easily respond to the stirring force of the rotary stirring blade 24, hence it is not easy to mix the two liquids. Also, there is a marked difference between a synthetic resin and a curing agent, hence the curing agent tends to flow down the inner wall of the cylindrical container, this resulting in concentrating the curing agent along the inner wall of the cylindrical container and enhancing curing in such part.

In a continuous mixer of two-liquid stirring type according to the present invention, however, the curing agent is fed through the liquid injection inlet 28 formed in the stationary stirring blades 18 into the central part to the inner peripheral part in the cylindrical container 10 without contacting either the outer peripheral surface of the rotor 22 or the inner peripheral wall of the cylindrical container 10 in a planer form or in extremely thin film form into the mass of synthetic resin, hence the curing agent and synthetic resin are caused to rotate spirally and sheared successively by stirring blades 18, 24 into fine particles and these two liquids are dispersed and mixed in finely subdivided form. Thus, the curing agent is prevented from direct contact with the inner wall of the cylindrical container 10 or the outer wall of the rotor 22, hence there is no risk of the curing agent sticking to the wall and the resultant occurrence of highly concentrating part or part of synthetic resin locally during curing.

When the viscosities of the two liquid components are both low, still quicker and more uniform mixing is feasible for the resultant centrifugal force-induced flow occurs in the radial direction. Also, since the two liquids successively stirred and mixed come out through the liquid outlet 16 while being stirred and mixed successively, there is no worry about the mixed liquids dwelling in the cylindrical container 10.

Thus, a preferred embodiment of the continuous two-liquid type mixer has been described in detail but the present invention is by no means limited thereby and many other embodiments are feasible.

Figure 6:
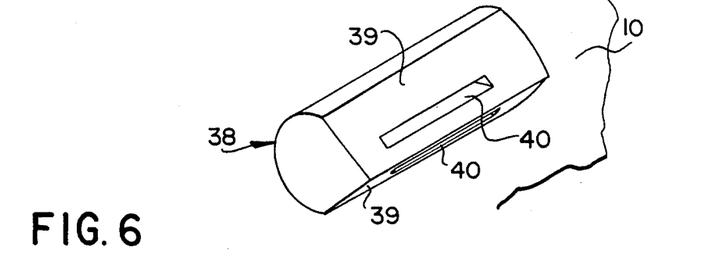
FIG. 6, 7, and 8 are enlarged perspective views showing other embodiments in which liquid injection inlets are provided in stationary stirring blades.

For instance, as shown in FIG. 6, a stationary stirring blade 38 may be so shaped that the part behind with respect to the direction of resin flow is formed as a slope 39 and each slope is provided with a liquid injection inlet 40. According to this embodiment, the resin being rotated by the rotary stirring blade 24 is easily released from the stationary stirring blade 38 without generation of air bubbles et cetera and, moreover, the curing agent is injected into a mass of resin from two liquid injection inlets 40 in the form of a still thinner film.

Figures 7, 8:
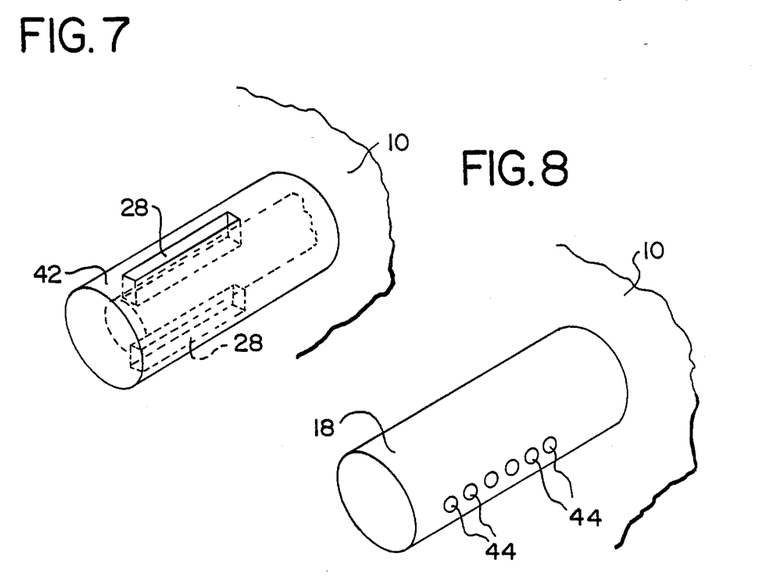

Also, as seen from FIG. 7, it is possible to form two injection liquid inlets 28, one in the top and the other in the bottom, being substantially perpendicular to the synthetic resin stream. In this embodiment, too, the liquid injection inlets 28 are formed in the plane where a negative pressure is caused by the synthetic resin stream, hence the curing agent can be smoothly injected through the liquid injection inlets 28.

Further, as shown in FIG. 8, it is possible to form liquid injection inlets 44 as round holes. In this embodiment, too, it is possible to arrange the liquid injection inlets 44 in the order of diameter.

Figure 9:
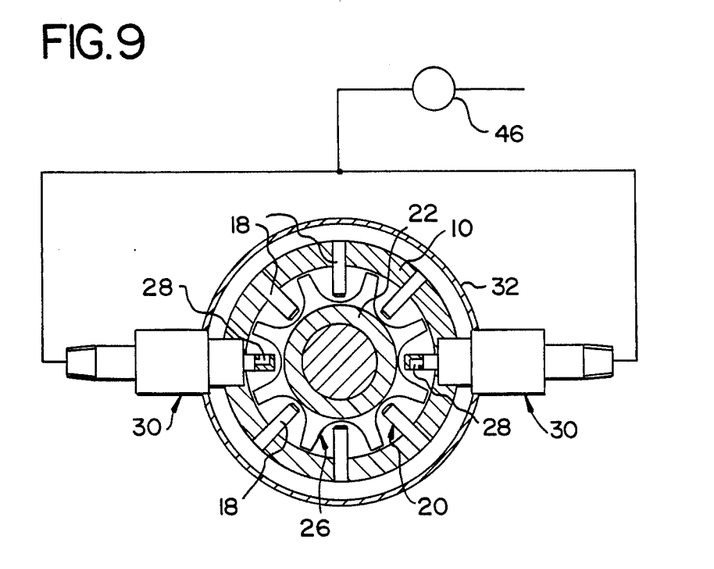
FIG. 9 is a horizontal sectional view showing a still further embodiment of the invention.

Furthermore, it is possible to form not only one liquid injection inlet not only one but also more than one, as shown in FIG. 9. As shown in this embodiment, it is also possible to have the curing agent fed by a pump 46 to simultaneously inject through the two liquid injection inlets 28 into the cylindrical container 10. In so doing, it is possible to subdivide a given volume of the curing agent and let it uniformly diffuse in the cylindrical container, to thereby enable still more uniform mixing and make it feasible to further miniaturize the device.

Figure 10:
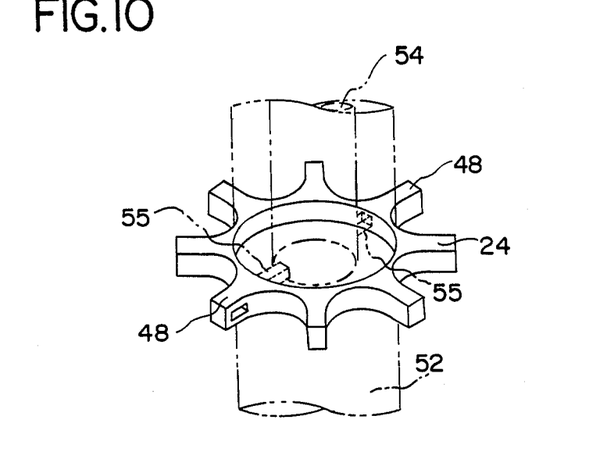
FIG. 10 is a perspective view showing the arrangement of the rotary stirring blade.
Figure 11:
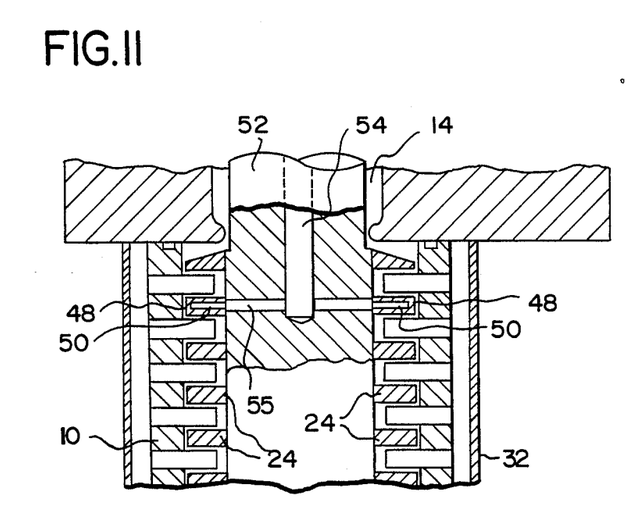
FIG. 11 is a longitudinal sectional view showing the essential parts.

In the aforementioned embodiments, the liquid injection inlet is invariably provided in the stationary stirring blades, but according to the present invention it is also possible to form the liquid injection inlet in the rotary stirring blades. For example, as shown in FIGS. 10 and 11, it is possible to provide a liquid injection inlet 50 on the side opposite to the rotating direction (clockwise in this embodiment) of the rotary stirring blade 48, that is, where relatively behind with respect to the flow of the resin caused by the rotary stirring blade 48, at the same time to have the liquid inlet 50 connected with a first channel 54 provided in a rotor 52 axially via a second channel 55 cut axially and perpendicularly to the first channel 54. By so designing, the curing agent pumped through the channels 54 and 55 can be fed uniformly and in a planar sheet form the liquid injection inlet 50 into the cylindrical container 10, and a function and effect similar to those described above are obtainable with no risk of the resin being sucked into the liquid injection inlet 50.

In the mixer of the present invention, the two liquids which flow through the cylindrical container 10 and between rows of stationary and rotary stirring blades, as shown in FIGS. 1 and 2, flow through the channel constituted by the inner wall of the cylindrical container 10, the outer wall of the rotor 22, the rows 20 of the stationary stirring blades and the rows 26 of the rotary stirring blades. It is possible to make the sectional area narrower from the liquid inlet side 14 to the liquid outlet side 16 continuously or stepwise to change the flow rate and/or the shearing force acting on the two liquids.

By so doing, the stirring action by the rows 20 of the stationary stirring blades and the rows 26 of the rotary stirring blades can be enhanced by increase of the liquids' flow velocity, and at the same time, when the pot life of the mixture of two liquids is short, the dwelling time can be made shorter, and it is even possible to feed the two liquids to a molding machine immediately after mixing. In this embodiment, when the viscosity of the mixture of two liquids should become lower, it is possible to arrange for making the shearing force acting on the mixture of two liquids substantially constant.

As such a mixer, it is possible in, for example, FIG. 1, to modify the mixer such that the clearance between the rows 20 of stationary stirring blades and the rows 26 of rotary stirring blades is reduced continuously or stepwise from the liquid inlet side 14 toward the liquid outlet side 16 to thereby decrease the sectional area of the flow channel of the two liquids continuously or stepwise.

Figure 12:
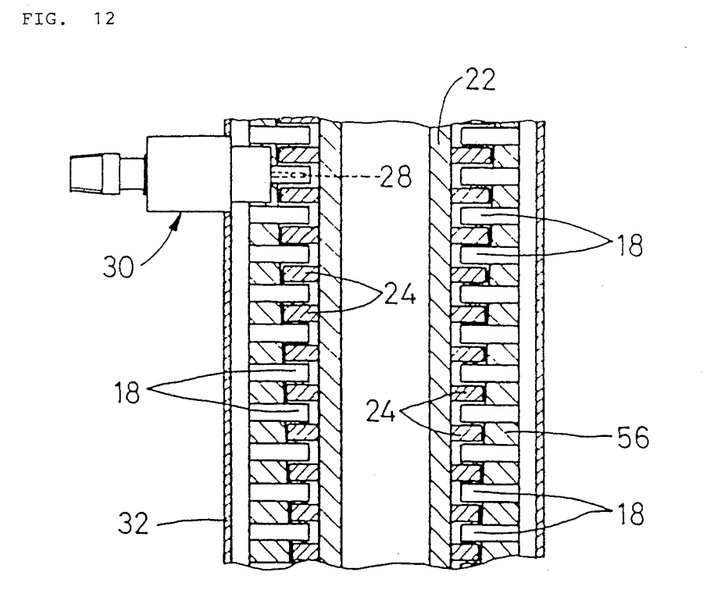
FIGS. 12 and 13 are longitudinal sectional views of the essential parts, both FIGS. showing further embodiments with the sectional area of the liquid flow channel getting progressively smaller toward the end thereof.
Figure 13:
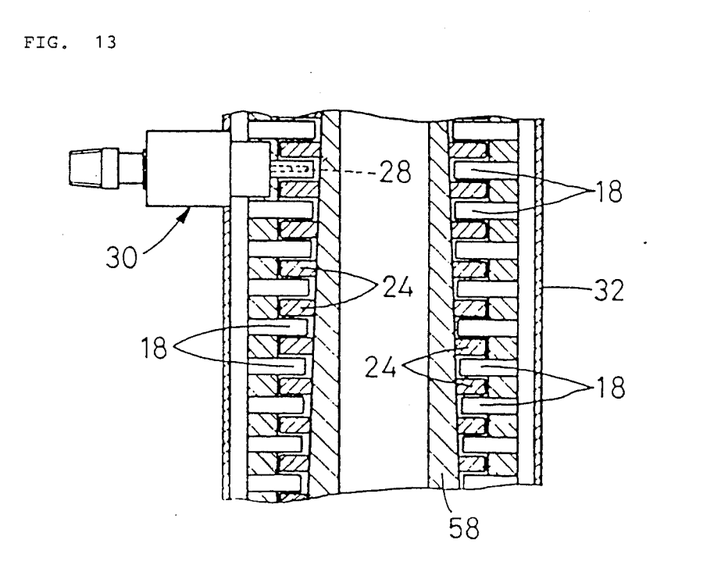

Also, as shown in FIG. 12, it is possible to make the inner diameter of the cylindrical container 56 to make it smaller from the liquid inlet 14 toward the liquid outlet 16 or, alternatively, as shown in FIG. 13, the outer diameter of the rotor 58 progressively larger from the liquid inlet 14 toward the liquid outlet 16 to make the sectional area progressively smaller.

Generally, in a system of mixing two liquids, change in viscosity of the liquid accompanies the progress of dispersion, mixing or progress of reaction. And, as mentioned above, it is possible to compensate the lowering in viscosities of the liquids by progressive reducing of the sectional area of the flow channel to thereby attain the homogeneous mixture even when the viscosity of the liquids should be reduced.

In contrast thereto, in the case of liquids whose viscosities are increased, a similar effect can be attained by making the sectional area of the flow channel for the two liquids wider continuously or stepwise.

For instance, it is also possible to arrange so that the shearing force is increased by minimizing the clearance between the rows of stationary and rotary stirring blades in the vicinity of the liquid injection inlet for the curing agent, and thereafter the shearing force in decreased by increasing the aforementioned clearance.

Figure 14:
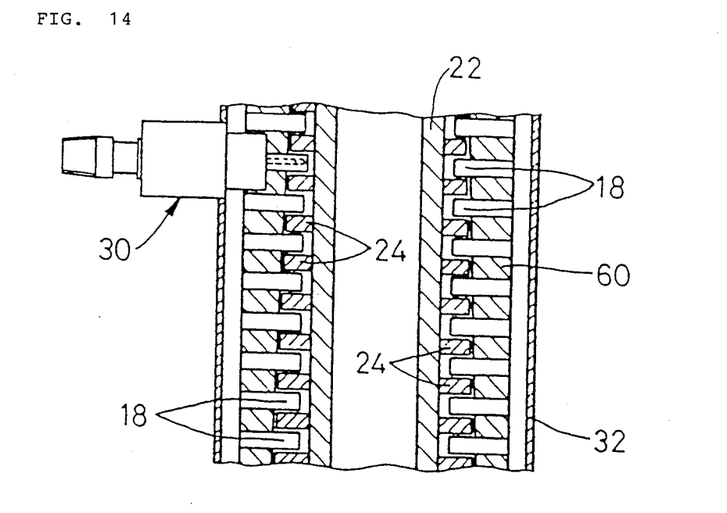
FIGS. 14 and 15 are longitudinal sectional views of the essential parts, showing still further embodiments with the sectional area of the liquid flow channel getting progressively larger toward the end thereof.

It is also possible, as shown in FIG. 14, to increase the inner diameter of a cylindrical container 60 progressively from the liquid inlet 14 toward the outlet 16 to thus increase the sectional area of the flow channel progressively or, although illustration is omitted, it is also possible to make the outer diameter of the rotor 22 progressively smaller.

Thus, it is possible to increase the shearing force acting on the two liquids by reducing the sectional area of the flow channel in the vicinity of the liquid injection inlet for the curing agent to enable quick mixing, and thereafter increase the flow-channel to thereby reduce the shearing force acting on the two liquids to familialize, further homogenizing the two liquids. Further in this embodiment, when the viscosity of the two liquids to be mixed is increased as they are mixed, the shearing force acting on the two liquids to be mixed is gradually decreased so that, as a whole, a substantially uniform force acts on the two liquids. Further, by prolonging the dwelling time of the two liquids to be mixed, it is possible to effectively cool the mixture in the mixer before it is fed to the molding machine.

Figure 15:
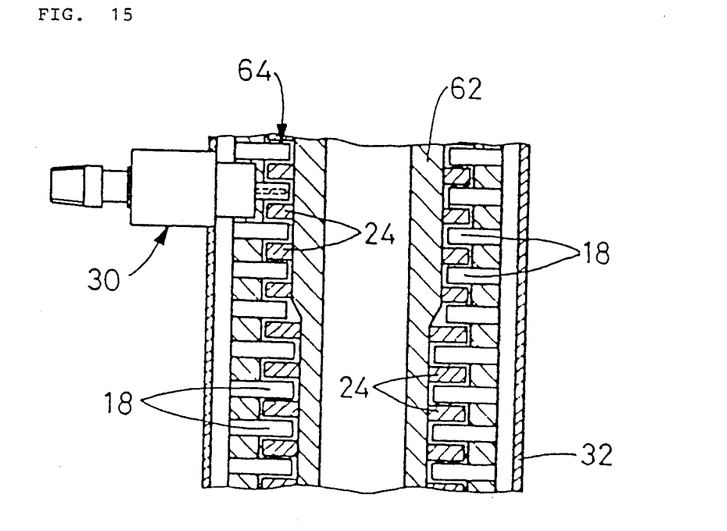

Further, as shown in FIG. 15, it is possible to increase the outer diameter of a rotor 62 for a given length to thereby make the sectional area of the flow channel smaller and the two liquids are mixed by quickly mixing two liquids with a high shearing force in narrow section 64, and cause the two liquids to be familialized in the widened section of the flow channel.

Figure 16:
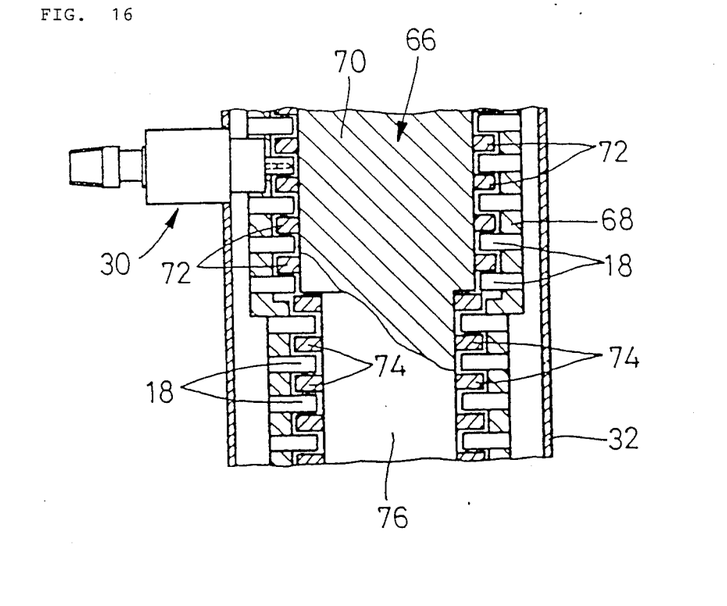
FIG. 16 is a longitudinal sectional view showing a still further embodiment wherein stirring is effected with the peripheral speed of the rotary stirring blade partly raised.

Still further, as shown in FIG. 16, it is possible to provide a section of an increased diameter 70 where the outer of a rotor 66 and the inner diameter of the cylindrical container 68 are both increased. It is then possible to increase the peripheral speed of the rotary stirring blades 72 in the section of an increased diameter 70, and after finely shearing the two liquids for mixing them quickly, it is possible to familiarize the mixture of two liquids in the section of decreased diameter 76 where the peripheral speed of the rotary stirring blades 74 at the same time cooling the mixture efficiently. In this embodiment the sectional areas of the flow channel may be made constant in the section of the increased diameter 70 as well as the section of the decreased diameter 76.

Besides, it is also possible to make the volumes of the stationary stirring blades 18 and/or the rotary stirring blades 24 progressively larger or smaller to make the sectional area smaller or larger, and the cylindrical container may not necessarily be round and may be polygonal.

Although embodiments of the present invention have been described with synthetic resin of two-liquid curing type resin as an example, in which the curing agent is added through a liquid injection inlet, the invention is also useful when two liquids such as solutions of pigments are continuously mixed, and in such a case as the liquid to be added through the liquid injection inlet is chosen the one smaller in volume of the two liquids. In that case, the liquid injection inlet may be provided for both stationary stirring blades and rotary stirring blades, and it is also possible to shape the stationary stirring blades and the rotary stirring blades to be oval or streamlined in section, and it is further possible to properly combine the aforementioned embodiments. Thus the present invention is adaptable to various modifications or improvements revisions bases based on the knowledge of those skilled in the art.

According to the invention, to a liquid being stirred by the stationary stirring blades and the rotary stirring blades, another liquid is injected through the liquid injection inlet formed in the stationary stirring blades into the central part of the liquid to be stirred, or from the center of the liquid to the outer peripheral portions in a planar sheet form so that the injected another liquid is covered by the liquid pumped through the liquid inlet without being brought into direct contact with the rotor's outer wall or the inner wall of the cylindrical container, whereby both liquids are sheared by the stirring blades into fine particles and dispersed and homogenized. Hence, even highly viscous liquids can be mixed together quickly and homogeously.

Furthermore, the sectional area of the flow channel is made progressively smaller or larger from the liquid inlet side to the outlet side of the cylindrical container for proper variation of the liquid's flow rate and the shearing force acting on the mixed two liquids. Hence, even if there should occur variation in viscosity as a result of mixing, it is possible to arbitrarily set the dwelling time of the mixture of two liquids and the shearing force acting thereon.

Therefore, in the case of a synthetic resin of the reactive curing type, the present invention ensures against dwelling in the cylindrical container of a reactive curing resin not uniformly mixed or partly mixed material to dwell in a cylindrical container to thereby interfere with progress of curing of the uncured synthetic resin having contained therein cured or semicured resin masses, this being an important feature of the present invention.

What is claimed is:

1. A continuous two-liquid type mixer comprising a cylindrical container having a liquid inlet at one end and an outlet at the other end;

rows of stationary stirring blades formed on the inside of said cylindrical container protruding substantially radially on the same periphery;

a rotor to rotate about the same axis and housed in said cylindrical container; and rows of stationary stirring blades on the outside of said rotor protruding substantially radially on the same periphery in an alternate relation with said rows of stationary stirring blades on the inside of said cylindrical container, a flow channel defined by said cylindrical container with rows of stationary stirring blades and the rotor with rows of rotary stirring blades, a sectional area of the defined flow channel is made smaller or larger continuously or step wise from said liquid inlet side toward said liquid outlet side, and;

at least one liquid injection inlet is provided in either or both of said stirring blades on said liquid inlet side.

2. A continuous two-liquid type mixer according to claim 1, wherein the clearance between said cylindrical container with said rows of stationary stirring blades and said rotor with said rows of rotary stirring blades is made smaller or larger continuously or stepwise from said liquid inlet side to said liquid outlet side.

3. A continuous two-liquid type mixer according to claim 2, wherein said cylindrical container is provided with a section of increased diameter where outer diameter and inner diameter are increased respectively.

4. A continuous two-liquid type mixer comprising:
a cylindrical container having a liquid inlet at one end and an outlet at the other end;
rows of stationary stirring blades formed on the inside of said cylindrical container protruding substantially radially on the same periphery;
a rotor to rotate about the same axis and housed in said cylindrical container; and
rows of rotary stirring blades on the outside of said rotor protruding substantially radially on the same periphery in an alternate relation with said rows of stationary stirring blades on the inside of said cylindrical container, wherein said cylindrical container is provided with a section of increased diameter where outer diameter and inner diameter are increased respectively; and at least one liquid injection inlet is provided in either or both of stirring blades on said liquid inlet side and is positioned relatively behind the liquid flow generated by rotation of said rotary stirring blades.

5. A continuous two-liquid type mixer comprising:
a cylindrical container having a liquid inlet at one end and an outlet at the other end;
rows of stationary stirring blades formed on the inside of said cylindrical container protruding substantially radially on the same periphery;
a rotor to rotate about the axis and housed in said cylindrical container;
rows of rotary stirring blades on the outside of said rotor protruding substantially radially on the same periphery in an alternate relation with said rows of stationary stirring blades on the inside of said cylindrical container, wherein said cylindrical container is provided with a section of increased diameter where outer diameter and inner diameter are increased respectively; and
at least one liquid injection inlet provided in either or both of said stirring blades on said liquid inlet side, said liquid injection inlet is formed as a slit.

6. A continuous two-liquid type mixer according to claim 1, wherein said cylindrical container is provided with a section of increased diameter where outer diameter and inner diameter are increased respectively.

* * * * *

UNITED STATES PATENT AND TRADEMARK OFFICE
CERTIFICATE OF CORRECTION

PATENT NO. : 4,976,547
DATED      : December 11, 1990
INVENTOR(S) : HISANAGA et al It is certified that error appears in the above-identified patent and that said Letters Patent is hereby corrected as shown below:

ON TITLE PAGE: Item [57], line 3, "an liquid inlet" should read --a liquid inlet--;
line 11, "radically" should read --radially--.

Column 1, line 17, "polymide" should read --polyimide--;
line 32, "a resulting" should read --resulting--; and
line 62, "and the curing" should read --the curing--.

Signed and Sealed this

Eighteenth Day of August, 1992

Attest:

DOUGLAS B. COMER

Attesting Officer    Acting Commissioner of Patents and Trademarks